(12) United States Patent
Pourahmady et al.

(10) Patent No.: US 9,809,675 B2
(45) Date of Patent: Nov. 7, 2017

(54) POLYMERS MADE FROM TELECHELIC N-ALKYLATED POLYAMIDES

(71) Applicant: Lubrizol Advanced Materials, Inc., Cleveland, OH (US)

(72) Inventors: Naser Pourahmady, Solon, OH (US); Umit G. Makal, Stow, OH (US); Gabor Erdodi, Macedonia, OH (US); John Ta-Yuan Lai, Broadview Heights, OH (US)

(73) Assignee: LUBRIZOL ADVANCED MATERIALS, INC., Cleveland, OH (US)

( * ) Notice: Subject to any disclaimer, the term of this patent is extended or adjusted under 35 U.S.C. 154(b) by 15 days.

(21) Appl. No.: 14/767,157

(22) PCT Filed: Feb. 4, 2014

(86) PCT No.: PCT/US2014/014521
§ 371 (c)(1),
(2) Date: Aug. 11, 2015

(87) PCT Pub. No.: WO2014/126743
PCT Pub. Date: Aug. 21, 2014

(65) Prior Publication Data
US 2015/0376325 A1 Dec. 31, 2015

Related U.S. Application Data

(60) Provisional application No. 61/764,241, filed on Feb. 13, 2013.

(51) Int. Cl.
C08G 18/00 (2006.01)
C08G 69/00 (2006.01)
C08G 18/60 (2006.01)
C08G 18/65 (2006.01)
C08G 18/76 (2006.01)
C08G 69/26 (2006.01)
C08G 69/40 (2006.01)
C08G 69/44 (2006.01)

(52) U.S. Cl.
CPC ........ *C08G 18/603* (2013.01); *C08G 18/6511* (2013.01); *C08G 18/7671* (2013.01); *C08G 69/26* (2013.01); *C08G 69/265* (2013.01); *C08G 69/40* (2013.01); *C08G 69/44* (2013.01)

(58) Field of Classification Search
None
See application file for complete search history.

(56) References Cited

U.S. PATENT DOCUMENTS

| | | |
|---|---|---|
| 4,452,922 A | 6/1984 | Speranza et al. |
| 5,130,382 A * | 7/1992 | Speranza ............. C08G 18/603 525/420 |
| 2008/0223519 A1 | 9/2008 | Locko et al. |

* cited by examiner

*Primary Examiner* — Ana Woodward
(74) *Attorney, Agent, or Firm* — Eryn Ace Fuhrer; Christopher D. Hilker; Teresan W. Gilbert

(57) ABSTRACT

This invention relates to polymers made from low molecular weight polyamide oligomers and telechelic polyamides (including copolymers) containing N-alkylated amide groups in the backbone structure. The described telechelic polyamides are used as the soft segment in the described TPU. These telechelic polyamides are unique in that they have an unexpectedly low glass-transition (desirably 30 degrees C. or lower) which makes them suitable for further reaction and polymerization, allowing for the formation of the described TPU. The resulting TPU can provide improved hydrolytic, oxidative and/or thermal stability as well as improved adhesion to other materials, especially polar materials.

17 Claims, No Drawings

POLYMERS MADE FROM TELECHELIC N-ALKYLATED POLYAMIDES

CROSS REFERENCE TO RELATED APPLICATION

This application claims priority from PCT Application Ser. No. PCT/US2014/014521 filed Feb. 4, 2014 which claims the benefit of U.S. Provisional Application No. 61/764,241 filed on Feb. 13, 2013.

FIELD OF INVENTION

The invention relates to polymers made using telechelic polyamides, including those that are liquid below about 70° C. and can be reacted into other polymer networks to impart desirable properties.

BACKGROUND OF THE INVENTION

Thermoplastic polyurethanes (TPU) are useful materials well known in the art. They are generally prepared by reacting a polyisocyanate with a polyol and optionally a chain extender. The resulting materials have many useful properties and are used in a wide variety of applications.

TPU contain hard segments and soft segments, where the soft segments are typically polyester based or polyether based. Polyester TPU suffer from hydrolytic degradation while polyether TPU are prone to oxidative and/or thermal degradation. There is an ongoing need for TPU materials that have the expected useful properties but which also provide improved hydrolytic, oxidative and/or thermal stability.

There is also a desire to improve the adhesion of TPU materials to polar materials such as polyamides or polyesters, for example Nylon-6,6. Currently the ability to use TPU materials in combination with polar materials is limited due to the relatively poor adhesion between existing TPU materials and polar materials, especially where the application involves combining a layer of TPU material with a layer of polar material. The adhesion between the layer is too weak to meet the requirements for many applications where such a layer combination would otherwise be very useful. Thus, TPU cannot be used in many applications requiring high levels of adhesion between layers of TPU and other materials, especially polar materials. There is a continuing need for TPU materials with adhesion to other materials, especially polar materials, that would allow TPU to be used in applications where good/improved adhesion to other materials, especially polar materials, is required.

Overall there is a continuing need for an improved TPU material that has the expected useful properties of a polyether and/or polyester TPU but also provides improved hydrolytic, oxidative and/or thermal stability, improved adhesion to polar materials such as polyamides or polyesters, and some combination thereof.

SUMMARY OF THE INVENTION

This invention relates to polymers made from low molecular weight polyamide oligomers and telechelic polyamides (including copolymers) that include N-alkylated amide groups in the backbone structure. The described telechelic polyamides are used as the soft segment in the described TPU. These telechelic polyamides are unique in their ability to be processed as liquids at temperatures from 20 to 50 or 80° C. While not wishing to be bound by theory, it is believed this may be due to their having unexpectedly low glass-transition temperatures which makes them suitable for further reaction and polymerization, allowing for the formation of the described TPU. The resulting TPU can provide improved hydrolytic, oxidative and/or thermal stability as well as improved adhesion to other materials, especially polar materials.

The invention provides a polymer composition that includes the reaction product of: (i) a polyol component comprising a telechelic polyamide; and (ii) a polyisocyanate component; and optionally (iii) a chain extender component. The telechelic polyamide: (a) has repeat units derived from polymerizing monomers connected by linkages between the repeat units and functional end groups selected from carboxyl or primary or secondary amine, wherein at least 70 mole percent of telechelic polyamide have exactly two functional end groups of the same functional type selected from the group consisting of amino or carboxylic end groups; (b) has a polyamide segment comprising at least two amide linkages characterized as being derived from reacting an amine with a carboxyl group, and said polyamide segment comprising repeat units derived from polymerizing two or more of monomers selected from lactams, aminocarboxylic acids, dicarboxylic acids, and diamines (and also including any reactive equivalents of any of the above); (c) wherein at least 10 percent of the total number of the heteroatom containing linkages connecting hydrocarbon type linkages are characterized as being amide linkages; and (d) wherein at least 25 percent of the amide linkages are characterized as being tertiary amide linkages.

With regards to feature (b) above, the invention provides for the described polymer composition said polyamide segment is characterized as meeting at least one of the following conditions: (i) said amide linkages are derived from polymerizing amide forming monomers and at least 90 mole percent of said monomers are selected from the group consisting of lactams and aminocarboxylic acid monomers such that said polyamide is a copolymer of at least two different monomers; or (ii) said amide linkages are derived from polymerizing amide forming monomers and at least 90 mole percent of said monomers are combined amounts of dicarboxylic acid and diamine monomers such that said polyamide is a terpolymer of at least three different monomers; or (iii) said amide linkages are derived from polymerizing a combination of dicarboxylic acid, diamine and either lactam and/or aminocarboxylic acid monomers such that the total dicarboxylic acid monomer(s) and the diamine monomer(s) are present at 10 mole percent or more and the total lactam and/or aminocarboxylic acid monomers are present in the monomer blend at 10 mole percent or more. In still other embodiments, at least 25, 50, 75, 80, or even 95 percent of said amide linkages are characterized as tertiary amide linkages. In some embodiments at least 76 percent of said amide linkages are characterized as tertiary amide linkages.

In some embodiments at least 50 weight percent of said telechelic polyamide is made up of repeating units derived from monomers selected from the group of lactam monomers, aminocarboxylic acid monomers, dicarboxylic acid monomers, and diamine monomers.

In some embodiments at least 10 weight percent of said polymer is made up of repeating units derived from monomers selected from the group of lactam monomers, aminocarboxylic acid monomers, dicarboxylic acid monomers, and diamine monomers. In other embodiments at least 20, 30, or even 40 weight percent of said polymer is made up of these repeating units.

In some embodiments at least 50 weight percent of said polyamide segment comprises repeat units of the structure:

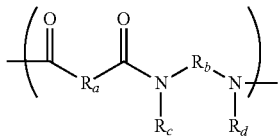

wherein $R_a$ is the alkylene portion of the dicarboxylic acid and is a cyclic, linear, or branched (optionally including aromatic groups) alkylene of 2 to 36 carbon atoms, optionally including up to 1 heteroatom per 3 to 10 carbon atoms of the diacid, more preferably from 4 to 36 carbon atoms and wherein $R_b$ is a direct bond or a linear or branched (optionally being or including cyclic, heterocyclic, or aromatic portion(s)) alkylene group (optionally containing up to 1 or 3 heteroatoms per 10 carbon atoms) of 2 to 60 carbon atoms and more preferably 2 to 36 or even 2 or 4 to 12 carbon atoms and $R_c$ and $R_d$ are individually a linear or branched alkyl group of 1 to 8 carbon atoms, more preferably 1 or 2 to 4 carbon atoms or $R_c$ and $R_d$ connect together to form a single linear or branched alkylene group of 1 to 8 carbon atoms or optionally with one of $R_c$ and $R_d$ is connected to $R_b$ at a carbon atom, more desirably $R_c$ and $R_d$ being an alkyl group of 1 or 2 to 4 carbon atoms.

In some embodiments the unit:

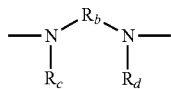

within the repeat unit structure of said polyamide segment is derived from polymerizing diamine monomers including piperazine.

In some embodiments at least 50 weight percent of said polyamide segment comprises repeat units of the structure:

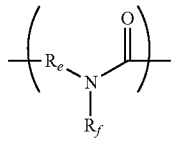

wherein said repeat units are derived from monomers selected from the group consisting of lactam monomers and amino carboxylic acid monomers; wherein each $R_e$ is independently a linear or branched alkyl containing 5 to 12 carbon atoms, and each $R_f$ is independently a linear or branched alkyl containing 1 to 8 carbon atoms.

In some embodiments the functional end groups of the telechelic polyamide of component (i) described above, before component (i) is reacted with component (ii) and optional component (iii), are reacted with another molecule to result in a telechelic polyamide with at least 80 mole percent primary or secondary hydroxyl end groups. In other words the described telechelic polyamide, where it has two carboxyl end groups, may be further reacted with a an amino alcohol and/or diol having one terminal amine and one terminal hydroxyl group or two terminal hydroxyl groups to provide endblocks for said telechelic polyamide. This amino alcohol and/or diol may be a polyether molecule, or it may be a polyester, a polycaprolactone, a polycarbonate, a mixtures thereof, or any one or more of the polyol materials described herein. The resulting polyamide, after adding said endblocks, has at least 80 mole percent terminal primary or secondary hydroxyl end groups.

In some embodiments at least 80 percent of the functional end groups of the telechelic polyamide of component (i) are secondary amine groups.

In some embodiments at least 80 percent of the functional end groups of the telechelic polyamide of component (i) are primary amine groups.

In some embodiments at least 80 percent of the functional end groups of the telechelic polyamide of component (i) are terminal primary or secondary hydroxyl end groups.

In some embodiments the telechelic polyamide has a weight average molecular weight from about 200 to 10,000 g/mole; and the telechelic polyamide, free of any solvents and/or has a viscosity of less than 100,000 cps at 70° C. as measured by a Brookfield circular disc viscometer with the circular disc spinning at 5 rpm.

The invention further provides for any of the described polymer compositions where the telechelic polyamide further comprises at least one oligomer segment, which may include a polyester segment, a polyether segment, a polycarbonate segment, or a combination thereof.

The invention provides a polymer composition comprising the reaction product of: (i) a polyol component comprising a telechelic polyamide; and (ii) a polyisocyanate component; and optionally (iii) a chain extender component; wherein the telechelic polyamide comprises: (a) two functional end groups selected from hydroxyl, carboxyl, or primary or secondary amine; and (b) a polyamide segment wherein: (i) said polyamide segment comprises at least two amide linkages characterized as being derived from reacting an amine with a carboxyl group; (ii) said polyamide segment comprises repeat units derived from polymerizing two or more monomers selected from the group consisting of lactam monomers, aminocarboxylic acids monomers, dicarboxylic acids monomers, and diamine monomers; and (iii) at least 76 mole percent of the amide linkages are derived from reacting a secondary amine group with a carboxyl group; where said telechelic polyamide, in some embodiments, may be characterized as a liquid with a viscosity of less than 100,000 cps at 70° C. as measured by a Brookfield circular disc viscometer with the circular disc spinning at 5 rpm; and wherein said telechelic polyamide is characterized by a weight average molecular weight from about 200 to 10,000 g/mole and comprises a diversity of amide forming repeating units disrupting hydrogen bonding between amide components.

The invention further provides for any of the described polymer compositions where the reaction product further includes one or more polyester segments and/or one or more polycarbonate segments, wherein said segments are chemically bound into said reaction product or physically blended with said reaction product.

In some embodiments component (ii), the polyisocyanate component, includes an aromatic diisocyanate, an aliphatic diisocyanate, or a mixture thereof.

In some embodiments component (ii), the polyisocyanate component, includes diphenyl methane-4,4'-diisocyanate (MDI), $H_{12}$ MDI, m-xylylene diisocyanate (XDI), m-tetramethyl xylylene diisocyanate (TMXDI), phenylene-1, 4-diisocyanate (PPDI), 1,5-naphthalene diisocyanate (NDI), diphenylmethane-3, 3'-dimethoxy-4, 4'-diisocyanate (TODI), isophorone diisocyanate (IPDI), 1,4-cyclohexyl diisocyanate (CHDI), hexamethylene diisocyanate (HDI), 1,6- diisocyanato-2,2,4,4-tetramethyl hexane (TMDI), 1,10-decane diisocyanate, trans-dicyclohexylmethane diisocyanate (HMDI), or any combination thereof.

In some embodiments component (iii), the chain extender component, includes one or more short chain glycols having from about 2 to about 10 carbon atoms.

In some embodiments component (iii), the chain extender component, includes ethylene glycol, diethylene glycol, propylene glycol, dipropylene glycol, tripropylene glycol, triethylene glycol, cis-trans-isomers of cyclohexyl dimethylol, neopentyl glycol, 1,4-butanediol, 1,6-hexandiol, 1,3-butanediol, and 1,5-pentanediol, benzene glycol (HQEE), xylylene glycols, resorcinol, bis(beta-hydroxyethyl) ether, catechol, or any combinations thereof.

The invention further provides a method of making a polymer composition comprising the steps of: (1) reacting (i) a polyol component comprising a telechelic polyamide; and (ii) a polyisocyanate component; and optionally (iii) a chain extender component. In the described methods the telechelic polyamide: (a) has repeat units derived from polymerizing monomers connected by linkages between the repeat units and functional end groups selected from carboxyl or primary or secondary amine, wherein at least 70 mole percent of telechelic polyamide have exactly two functional end groups of the same functional type selected from the group consisting of amino or carboxylic end groups; (b) has a polyamide segment comprising at least two amide linkages characterized as being derived from reacting an amine with a carboxyl group, and said polyamide segment comprising repeat units derived from polymerizing two or more of monomers selected from lactams, aminocarboxylic acids, dicarboxylic acids, and diamines; (c) wherein at least 50 percent of the amide linkages are characterized as being tertiary amide linkages, and (d) wherein at least 10 percent of the total number of the heteroatom containing linkages connecting hydrocarbon type linkages are characterized as being amide linkages.

In some embodiments of the method the functional end groups of the telechelic polyamide of component (i), before component (i) is reacted with component (ii) and optional component (iii), are reacted with another molecule to result in a telechelic polyamide with at least 80 mole percent primary or secondary hydroxyl end groups.

DETAILED DESCRIPTION OF THE INVENTION

Telechelic polymers, defined as macromolecules that contain two reactive end groups, can be used as cross-linkers, chain extenders, and important building blocks for various macromolecular structures, including block and graft copolymers, star, hyperbranched or dendritic polymers. Telechelic polymers of the polydiene, polyester, polyether, and polycarbonate type are well known in the art. These prior art telechelic polymers with functional end groups selected from primary or secondary hydroxyl, primary or secondary amine, and carboxylic acid have been reacted with complimentary reactants to form larger polymers with the properties of telechelic precursors. Easily processable polyamide telechelics have not been available, and so likewise have the availability of polymers made from such polyamide telechelics, such as thermoplastic polyurethane (TPU) made from such polyamide telechelics.

Polymers such as TPU made from polyester polyols render good mechanical properties and UV and heat resistance, but they suffer from poor hydrolysis resistance. Polyether polyols have better hydrolytic stability than polyester polyols, but fall short in UV and heat resistance. Polycarbonate polyols offer improved hydrolysis and thermal resistance over polyester polyols with some degree of increased hardness, but they are an order of magnitude more expensive than other polyols. Polydiene polyols are useful but are too hydrophobic to interact well with polar substrates. Some polydiene polyols are hydrogenated to reduce degradation mechanisms relying on residual unsaturation from the diene monomer. TPU made from any of these materials have generally poor adhesion to polar materials such as polyamides and polyesters. Therefore, anew class of telechelic polyamide will help overcome these problems and allow the preparation of polymers such as TPU that have improved overall properties.

Amine terminated polyamide oligomers were made with low viscosity, low glass transition temperature, suppressed crystallinity, low acid number, with various nitrogen or amide:hydrocarbon weight ratios (or hydrophilic/hydrophobic balance), with a controlled number of hydrogen bonding or non-hydrogen bonding amide groups. Polymers, and more specifically TPU, were made from the described amine terminated polyamide oligomers. The present invention is directed to these polymers.

The invention provides a polymer composition that includes the reaction product of: (i) a polyol component including the described telechelic polyamide; and (ii) a polyisocyanate component; and optionally (iii) a chain extender component.

The Polyisocyanate Component

The polyisocyanate component is not overly limited and may include any of the polyisocyanate generally used in the preparation of TPU. In some embodiments the polyisocyanate includes a diisocyanate, and may include aliphatic diisocyanates, aromatic diisocyanates, or a combination thereof. In some embodiments the polyisocyanate includes an aliphatic diisocyanates. In some embodiments the polyisocyanate includes an aromatic diisocyanates.

The use of multifunctional isocyanate compounds, i.e., triisocyanates, etc., which will cause crosslinking of the resulting polymer, are generally avoided in some embodiments and thus the amount used, if any, in such embodiments is generally less than 4 mole percent or even less than 2 mole percent based upon the total moles of all of the various isocyanates used.

Examples of suitable aromatic diisocyanates include 4,4'-methylenebis-(phenyl isocyanate) (MDI), 2,4'-methylenebis-(phenyl isocyanate), m-xylylene diisocyanate (XDI), m-tetramethyl xylylene diisocyanate (TMXDI), phenylene-1,4-diisocyanate (PPDI), 1,5-naphthalene diisocyanate (NDI), diphenylmethane-3,3'-dimethoxy-4,4'-diisocyanate (TODI), and toluene diisocyanate (TDI).

Examples of suitable aliphatic diisocyanates include isophorone diisocyanate (IPDI), 1,4-cyclohexyl diisocyanate (CHDI), hexamethylene diisocyanate (HDI), 1,6-diisocyanato-2,2,4,4-tetramethyl hexane (TMDI), 1,3-bis(isocyanatomethyl)cyclohexane (HXDI), 1,6-hexane diisocyanate (HDI), 1,10-decane diisocyanate, and dicyclohexylmethane diisocyanate (HMDI). A commonly used diisocyanate is 4,4'-methylenebis(phenyl isocyanate) (MDI). Dimers and trimers of the above diisocyanates may also be used as well as a blend of two or more diisocyanates.

The polyisocyanate used in this invention may also be in the form of a low molecular weight polymer or oligomer which is end capped with an isocyanate. For example, a hydroxyl terminated polyester intermediate may be reacted with an isocyanate-containing compound to create a low molecular weight polymer end capped with isocyanate. In the TPU field, such materials are normally referred to as pre-polymers. Such pre-polymers normally have a number average molecular weight (Mn) which is within the range of about 500 to about 10,000 Daltons.

The Chain Extender Component

The optional chain extender component is not overly limited and may include any of the chain extenders generally used in the preparation of TPU.

Suitable chain extenders include lower aliphatic or short chain glycols having from about 2 to about 10 carbon atoms and include for instance ethylene glycol, diethylene glycol, propylene glycol, dipropylene glycol, tripropylene glycol, triethylene glycol, cis-trans-isomers of cyclohexyl dimethylol, neopentyl glycol, 1,4-butanediol, 1,6-hexandiol, 1,3-butanediol, and 1,5-pentanediol. Aromatic glycols can also be used as the chain extender and are often the choice for high heat applications. Benzene glycol (HQEE) and xylylene glycols are suitable chain extenders for use in making the TPU of this invention. Xylylene glycol is a mixture of 1,4-di(hydroxymethyl) benzene and 1,2-di(hydroxymethyl) benzene. Benzene glycol is one suitable aromatic chain extender and specifically includes hydroquinone, i.e., bis(beta-hydroxyethyl) ether also known as 1,4-di(2-hydroxyethoxy) benzene; resorcinol, i.e., bis(beta-hydroxyethyl) ether also known as 1,3-di(2-hydroxyethyl) benzene; catechol, i.e., bis(beta-hydroxyethyl) ether also known as 1,2-di(2-hydroxyethoxy) benzene; and combinations thereof. In some embodiments, the chain extender is 1,4-butanediol.

Suitable chain extenders also include diamine chain extenders. Suitable diamine chain extenders can be aliphatic or aromatic in nature, such as alkylenediamines of from 1-30 carbon atoms (e.g., ethylenediamine, butanediamine, hexamethylenediamine).

In some embodiments the TPU of the invention are made using one or more chain extenders. In other embodiments the TPU of the invention are made without the use of any chain extenders.

The Polyol Component.

The polyol component used in the invention includes the described telechelic polyamide which are N-alkylated. They can be described as low molecular weight polyamide oligomers and telechelic polyamides (including copolymers) containing N-alkylated amide groups in the backbone structure.

The telechelic polyamides used in the invention are unique in that they may be liquid below about 70° C. and can be reacted into other polymer networks to impart desirable properties. Many polyamides, e.g. the various nylon polymers, are insoluble solids at temperatures of about 80 to 260° C. and thus would be difficult to homogenously react into other polymer networks. N-alkylating the nitrogen atom of the polyamide or the nitrogen bearing precursor of the polyamide disrupts some of the hydrogen bonding making the polyamide of this disclosure lower melting and more soluble.

The following terms have definitions as stated below:
Telechelic polymers, defined as macromolecules that contain two reactive end groups and are used as cross-linkers, chain extenders, and important building blocks for various macromolecular structures, including block and graft copolymers, star, hyperbranched or dendritic polymers. Telechelic polymers of the polydiene, polyester, polyether, and polycarbonate type are well known in the art. These prior art telechelic polymers with functional end groups selected from primary or secondary hydroxyl, primary or secondary amine, and carboxylic acid have been reacted with complimentary reactants to form larger polymers with the properties of telechelic precursors. Easy to process polyamide telechelics with low melting points have not been available.

We will use the parentheses to designate 1) that the something is optionally present such that monomer(s) means monomer or monomers or (meth)acrylate means methacrylate or acrylate, 2) to qualify or further define a previously mentioned term, or 3) to list narrower embodiments.

Polyester polyols, and often TPU made from such polyols, render good mechanical properties and UV resistance, but they suffer from poor hydrolysis resistance. Polyether polyols, and resulting TPU, have better hydrolytic stability than polyesters, but fall short in UV resistance. Polycarbonate polyols, and resulting TPU, offer improved hydrolysis resistance over polyesters with some degree of increased hardness, but they are an order of magnitude more expensive than other polyols. Polydiene polyols are useful but are too hydrophobic to interact well with polar substrates. Some polydiene polyols are hydrogenated to reduce degradation mechanisms relying on residual unsaturation from the diene monomer. Therefore, a new class of telechelic polyamide will help overcome these problems.

Amine terminated polyamide oligomers have now been discovered which have low viscosity, low glass transition temperature, suppressed crystallinity, low acid number, with various nitrogen or amide:hydrocarbon weight ratios (or hydrophilic/hydrophobic balance), and with a controlled number of hydrogen bonding or non-hydrogen bonding amide groups.

A series of polyamide oligomers from conventional difunctional acids and amines were made. The initial oligomers contained amine terminations and in reaction with diisocyanates form polyamide-polyurea backbone. However, the presence of strong hydrogen bond in these structures makes them very hard (high glass transition) even at low molecular-weight and therefore not suitable for further structural modifications or preparation higher molecular weight polymers or crosslinked networks. We discovered that substitution of N-alkyl groups on these polymers make then soft and easy to process.

This invention relates to TPU compositions prepared from these polyamide oligomers or telechelic polyamides, which are resistant to chain scission, e.g. by hydrolysis or UV degradation, useful as macromonomers, prepolymers or polymer segments to make higher molecular weight polymers and/or crosslinked polymer networks. The resulting TPU compositions have better thermal stability than similar polymers or networks from polyethers and/or polyesters due to the higher thermal stability of the amide bonds. Polymers built from moderate molecular weight polyamide oligomers and co-reactants that can form chemical bonds with co-reactive groups at the termini of the oligomers. These polymers have many of the properties of the polyamide oligomers from which they are made as the oligomers form a substantial weight percent of the final polymer. Modifying the molecular weight and composition of the oligomers can be used to achieve the desired properties. The composition may contain small amounts of other polymers and materials either as physical blends or where the other polymers or materials may be co-reacted into the polyamide.

The term polyamide oligomer will refer to an oligomer with two or more amide linkages, or sometimes the amount of amide linkages will be specified. A subset of polyamide oligomers will be telechelic polyamides. Telechelic polyamides will be polyamide oligomers with high percentages, or specified percentages, of two functional groups of a single chemical type, e.g. two terminal amine groups (meaning either primary, secondary, or mixtures), two terminal carboxyl groups, two terminal hydroxyl groups (again meaning primary, secondary, or mixtures), or two terminal isocyanate groups (meaning aliphatic, aromatic, or mixtures). Ranges for the percent difunctional that are preferred to meet the definition of telechelic are at least 70 or 80, more desirably at least 90 or 95 mole % of the oligomers being difunctional as opposed to higher or lower functionality. Reactive amine terminated telechelic polyamides will be telechelic polyamide oligomers where the terminal groups are both amine types, either primary or secondary and mixtures thereof, i.e. excluding tertiary amine groups.

The invention involves the use of the described polyamide oligomers or telechelic polyamides in the preparation of TPU compositions. The polyamide oligomers or telechelic polyamides may be used as the polyol component in the TPU forming reaction.

The invention includes the substitution of polyamide segments for polyester, polyether, or polycarbonate soft segments in telechelic oligomers. The replacement or substitution of polyamide segments for polyester, polyether, or polycarbonate segments can be partial or complete. Optimum environmental resistance, including thermal stability, would result from complete replacement of polyester and polyether segments, due to their potential for easier chain scission in polyethers and polyesters. In some embodiments some of the polyester and or polyether segments could be retained in the telechelic polyamide or polyamide oligomer for their ability to soften the elastomeric portion or modify the compatibility of the resulting polymer with other polymer surfaces. When polymer from polyesters or polyether are degraded by hydrolysis or UV activated chain scission the molecular weight of the polymer is decreased such that the polymer, or segment, soon loses its tensile strength, elongation to break, resistance to solvents, etc.

A second benefit of the invention, substituting soft polyamide segments for soft polyether or polyester segments, is that the polyamide segments tend to promote better wetting and adhesion to a variety of polar substrates, such as glass, nylon, and metals than polyester or polyether based polymers. The hydrophobic/hydrophilic nature of the polyamide can be adjusted by using different weight ratios of hydrocarbon to amide linkages, or nitrogen atoms, in the polyamide. Diacids, diamines, aminocarboxylic acids, and lactams with large aliphatic hydrocarbons portions relative to the amide linkage portion tend to be hydrophobic. When the hydrocarbon weight ratio to amide linkage, or nitrogen atoms, becomes smaller, the polyamide is more hydrophilic. Increasing the amount of polyamide in a polymer can increase adhesion to substrates that have similar or compatible surfaces to polyamides.

TPU made from described polyamide segments can have good solvent resistance. Solvents can cause deformation and swelling of a polymer thereby causing premature failure of the polymer. Solvents can cause a coating to swell and delaminate from a substrate at the interface between the two.

It should be noted that many of the polyamides of the prior art are high melting point crystalline polyamides such as 6-nylon, 6,6-nylon, 6,10-nylon that melt at temperatures much too high, e.g. in excess of 100° C., to serve as soft segments if a blocky thermoplastic polymer is desired. In some of the prior art publications the polyamide, often a crystalline or high Tg polyamide type, was added merely to increase the surface interaction with a substrate that was compatible to polyamides. To create a lower Tg polymer, soft (low Tg) polyester, polyether or polycarbonates were added to the polyamide segment to provide a lower composite Tg elastomeric segment. In other prior art publications only a few polyamide linkages were inserted into a polymer to modify the polarity of the polymer, to increase solvent resistance, or to raise the softening temperature.

One objective of the current patent application is to use high percentages of amide linkages in a telechelic oligomer comprised of one or more polyamide segments to provide resistance to chain scission from hydrolysis and/or UV activated chain scission. Thus many embodiments will describe soft segments with high percentages of total linkages between repeat units in the soft segment being amide linkages. Some embodiments may allow for some linkages between repeat units to be other than amide linkages.

An important modification from conventional polyamides to get low Tg polyamide soft segments is the use of monomers with secondary amine terminal groups in forming the polyamide. The amide linkage formed from a secondary amine and a carboxylic acid type group is called a tertiary amide linkage. Primary amines react with carboxylic acid type groups to form secondary amides. The nitrogen atom of a secondary amide has an attached hydrogen atom that often hydrogen bonds with a carbonyl group of a nearby amide. The intra-molecular H-bonds induce crystallinity with high melting point and can act as crosslinks reducing chain mobility. With tertiary amide groups the hydrogen on the nitrogen of the amide linkage is eliminated along with hydrogen bonding. A tertiary amide linkage that has one additional alkyl group attached to it as compared to a secondary amide group, which has hydrogen attached to it, has reduced polar interactions with nearby amide groups when the polymer exists in a bulk polymer sample. Reduced polar interactions mean that glassy or crystalline phases that include the amide linkage melt at lower temperatures than similar amide groups that are secondary amide groups. One way to source secondary amine reactant, a precursor to tertiary amide linkages, is to substitute the nitrogen atom(s) of the amine containing monomer with an alkyl group. Another way to source a secondary amine reactant is to use a heterocyclic molecule where the nitrogen of the amine is part of the ring structure. Piperazine is a common cyclic diamine where both nitrogen atoms are of the secondary type and part of the heterocyclic ring.

Another modification to reduce the Tg of the polyamide soft segments is to use at least one additional monomer beyond the minimum number of monomers to form the polyamide. Thus for a polyamide formed from a lactam polymerization such as from N-methyl-dodecyl lactam one would include an additional lactam, aminocarboxylic acid, diamine, or dicarboxylic acid in the monomers for the polymerization to change the spacing (among repeat units) between the amide linkages formed by the monomer so that the spacing between the amide linkages in the polyamide is irregular along the backbone, e.g. not the same physical dimension for some of the repeat units in each oligomer. For a polymerization of aminocarboxylic acid one would include additional lactam, aminocarboxylic acid, diamine, or dicarboxylic acid (with different physical length between the primary reactive groups of the monomer) in the monomer blend for the polymerization to change the spacing among repeat units between the amide linkages. Switching end groups on the monomers can also disrupt regularity in the spacing of the polar amide linkages and lower the effective Tg of the copolymer. Thus co-polymerizing a $C_6$ amino carboxylic acid with a small portion of a $C_6$ diacid and $C_6$ diamine can disrupt regularity of the amide linkages as the diacid and diamine units would switch the orientation of the amide linkage from head to tail orientation to tail to head orientation, slightly disrupting uniformity of spacing of the amide linkages along the polyamide backbone. Typically when following this procedure one would try to add a disrupting monomer that increased or decreased the number of atoms between the amide forming end groups of the monomer(s) used as the primary monomer in the polyamide. One could also use a second disrupting monomer that had a cyclic structure, such as piperazine, a cyclic diamine monomer where two methylene atoms form the top half of the ring and two methylene atoms form the bottom half of the ring, to disrupt the regularity of polyamide formed from a diacid reacted with a diamine monomer with two methylene atoms between the nitrogen atoms of the diamine.

Another way to express the use of a copolymerization method to reduce the Tg and consequently the hardness of the polyamide is that the polyamide is characterized as being within (a), (b) or (c): (a) when said amide linkages are derived from polymerizing one or more monomers and more than 90 mole percent of said monomers are derived from polymerizing monomers selected from lactam and aminocarboxylic acid monomer then said polyamide is defined as a copolymer of at least two different monomers (meaning said monomers are characterized as being at least two different monomers because they have hydrocarbyl portion of different spacing length between the amine and carboxylic acid groups, wherein each of said at least two different monomers is present at molar concentrations of at least 10%, more desirably at least 20 or 30% of the total lactam and/or aminocarboxylic acid monomers in said polyamide); or (b) when said amide linkages are derived from polymerizing two or more monomers and more than 90 mole percent of said monomers were derived from polymerizing dicarboxylic acid and diamine monomers then said polyamide is defined as a terpolymer of at least three different monomers (meaning said amide linkages are formed from at least three different monomers selected from the group of dicarboxylic acid and diamine monomers wherein said at least three different monomers are characterized as different from each other by a hydrocarbyl group of different spacing length between the carboxylic acid groups of the dicarboxylic acid, or different spacing length between the amine groups of the diamine, wherein each of said at least three different monomers is present at concentrations of at least 10 mole %, more desirably at least 20 or 30 mole percent, of the total monomers in said polyamide); or (c) with the proviso that if said amide linkages are derived from polymerizing a combination of dicarboxylic acid, diamine and either lactam and/or aminocarboxylic acid monomers such that the total dicarboxylic acid monomer(s) and the diamine monomer(s) are present in the monomer blend at concentrations of at least 10 mole percent, more desirably at least 20 or 30 mole percent, and the total lactam and aminocarboxylic acid monomers are present in the monomer blend at concentrations of at least 10 mole %, more desirably at least 20 or 30 mole percent, then there are no restrictions requiring additional different monomers.

Generally having nearly equal amounts of two or more different amide forming monomers results in different spacing between the amide linkages along the polyamide backbone and affords optimal reduction of the crystalline melting and glass transition temperatures. For example, a 50:50 mole blend of two different diamines would be desirable. A 50:50 mole blend of two different diacids would be desirable. A 33:33;33 mole blend of a lactam with a diacid and a diamine would be desirable.

We use the term low Tg, glass transition temperature, even though we realize most of the polyamide segments are initially low molecular weight and it would not be easily possible to measure the Tg of the low molecular weight oligomers, the measured value would be dramatically affected by molecular weight. High Tg polymers, e.g. having Tg values above 70, 80, or 90° C. as measured by differential scanning calorimetry (DSC), would tend to form solids or gels even at low molecular weights. Thus the polyamide oligomers, telechelic polyamides, and even the oligomers from telechelic polyamides or polyamide oligomers are often described in this specification by their viscosity at specific temperatures. Low Tg polyamides oligomers will be defined as those compositions that would have Tg, if above 20,000 g/mole molecular weight, of below 50° C., more desirably below 25 or 0° C.

In one embodiment the telechelic oligomer or telechelic polyamide will have a viscosity measured by a Brookfield circular disc viscometer with the circular disc spinning at 5 rpm of less than 100,000 cps at a temperature of 70° C., more desirably less than 15,000 or 10,000 cps at 70° C., still more desirably less than 100,000 cps at 60 or 50° C., and more preferably less than 15,000 or 10,000 cps at 60° C.; and still more preferable less that 15,000 or 10,000 cps at 50° C. Desirably these viscosities are those of neat telechelic prepolymers or polyamide oligomers without solvent or plasticizers. These viscosity values will facilitate mixing the telechelic polyamide with co-reactants and or particulate materials under suitable conditions that desirable reactions occur at reasonable rates and undesirable reactions, e.g. side reactions, do not occur to any significant extent. In some embodiments the telechelic polyamide can be diluted with solvent to achieve viscosities in these ranges.

Many of the oligomers, telechelics, and polymers of this specification are made by condensation reactions of reactive groups on desired monomer(s). Lactam polymerization into a polyamide results in similar amide linkages by a chain polymerization process and is well known in the art. These condensation reactions between carboxylic acid groups and amine or hydroxyl groups are well known and are driven by the removal of water and or catalysts. The formation of amides from the reaction of carboxylic acid groups and amine groups can be catalyzed by boric acid, boric acid esters, boranes, phosphorous acid, phosphates, phosphate esters, amines, acids, bases, silicates, and silsesquioxanes. Additional catalysts, conditions, etc. are available in textbooks such as "Comprehensive Organic Transformations" by Larock.

The condensation reaction of reactive groups will be defined as creating chemical linkages between the monomers. The portion of the monomer that is incorporated into the oligomer or polymer will be defined as the repeat unit from the particular monomer. Some monomers, such as aminocarboxylic acid, or one end of diacid reacting with one end of a diamine, lose one molecule of water as the monomer goes from a monomer to a repeat unit of a polymer. Other monomers, such as lactams, isocyanates, amines reacted with isocyanates, hydroxyl groups reacted with isocyanates, etc. do not release a portion of the molecule to the environment but rather retain all of the monomer in the resulting polymer.

We will define polyamide oligomer as a species below 20,000 g/mole molecular weight, e.g. often below 10,000; 5,000; 2,500; or 2000 g/mole, that has two or more amide linkages per oligomer. Later we will define preferred percentages of amide linkages or monomers that provide on average one amide linkage per repeat unit in various oligomeric species. A subset of polyamide oligomer will be telechelic oligomer. The telechelic polyamide has molecular weight preferences identical to the polyamide oligomer above. The term telechelic has been earlier defined. Multiple polyamide oligomers or telechelic polyamides can be linked with condensation reactions to form polymers, generally above 100,000 g/mole.

Generally amide linkages are formed from the reaction of a carboxylic acid group with an amine group or the ring opening polymerization of a lactam, e.g. where an amide linkage in a ring structure is converted to an amide linkage in a polymer. In a preferred embodiment a large portion of the amine groups of the monomers are secondary amine groups or the nitrogen of the lactam is a tertiary amide group. Secondary amine groups form tertiary amide groups when the amine group reacts with carboxylic acid to form an amide. For the purposes of this disclosure the carbonyl group of an amide, e.g. as in a lactam, will be considered as derived from a carboxylic acid group. The amide linkage of a lactam is formed from the reaction of carboxylic group of an aminocarboxylic acid with the amine group of the same aminocarboxylic acid. In one embodiment we want less than 20, 10 or 5 mole percent of the monomers used in making the polyamide to have functionality in polymerization of amide linkages of 3 or more. This will reduce branching in the polyamide oligomer or telechelic polyamide.

The polyamide oligomers and telechelic polyamides of this disclosure can contain small amounts of ester linkages, ether linkages, urethane linkages, urea linkages, etc. if the additional monomers used to form these linkages are useful to the intended use of the polymers. This allows other monomers and oligomers to be included in the polyamide to provide specific properties, which might be necessary and not achievable with a 100% polyamide segment oligomer. Sometimes added polyether, polyester, or polycarbonate provides softer e.g. lower Tg, segments. Sometimes it is desirable to convert the carboxylic end groups or primary or secondary amine end groups of a polyamide to other functional end groups capable of condensation polymerizations. A telechelic polyamide with carboxylic end groups can be converted into an oligomer with hydroxyl end groups by reacting the telechelic polyamide with a polyether that has two hydroxyl end groups or a polyether that has one amino, primary or secondary, and one hydroxyl end group. Oligomers or polymers with polyether segments have susceptibility to chain breakage due to UV exposure. The effect of UV exposure on block copolymers of nylon 6-polyethylene glycol block copolymers is reported in Gauvin, Pascal; Lemaire, Jacques in Makromolekulare Chemie (1987), 188 (5), 971-986. Sometimes an initiator for oligomer chain polymerization of a lactam is used that doesn't generate an amide linkage. Sometimes a polyether might be used as a segment or portion of a polyamide to reduce the Tg, or provide a soft segment, of the resulting polyamide oligomer. Sometimes a polyamide segment, e.g. possibly difunctional with carboxylic acid or amine terminal groups, can be functionalized with two polyether end segments (such as from Jeffamine™ D230) to further lower the Tg of, or provide a soft segment in, the polyamide oligomer and create a telechelic polyamide with amine or hydroxyl end groups. Sometimes a carboxylic acid terminated telechelic polyamide segment is functionalized by reacting with an amino alcohol, e.g. N-methylaminoethanol, which can create a telechelic polyamide with terminal hydroxyl groups. In one embodiment the functional primary or secondary amine groups of a telechelic polyamide are reacted with a lactone of 2, 3 or 4 to 10 carbon atoms (e.g. a, butyro-, valero-, or caprolactone) and/or hydroxyl carboxylic acid of 3 to 30 carbon atoms to create one or two hydroxyl functional end groups derived from said lactone or said hydroxyl carboxylic acid on said telechelic polyamide. Optimally only one repeat unit from said lactone or hydroxyl carboxylic acid is added to each end of said telechelic polyamide.

As earlier indicated many amide forming monomers create on average one amide linkage per repeat unit. These include diacids and diamines when reacted with each other, aminocarboxylic acids, and lactams. These monomers, when reacted with other monomers in the same group, also create amide linkages at both ends of the repeat units formed. Thus we will use both percentages of amide linkages and mole percent and weight percentages of repeat units from amide forming monomers. Amide forming monomers will be used to refer to monomers that form on average one amide linkage per repeat unit in normal amide forming condensation linking reactions.

In one embodiment desirably at least 10 mole percent, more desirable at least 25, 45 or 50, and still more desirably at least 60, 70, 80, 90, or 95 mole % of the total number of the heteroatom containing linkages connecting hydrocarbon type linkages are characterized as being amide linkages. Heteroatom linkages are linkages such amide, ester, urethane, urea, ether linkages where a heteroatom connects two portions of an oligomer or polymer that are generally characterized as hydrocarbons (or having carbon to carbon bond, such as hydrocarbon linkages). As the amount of amide linkages in the polyamide increase the amount of repeat units from amide forming monomers in the polyamide increases.

In one embodiment desirably at least 25 wt. %, more desirable at least 30, 40, 50, more desirably at least 60, 70, 80, 90, or 95 wt. % of the polyamide oligomer or telechelic polyamide is repeat units from amide forming monomers, also identified as monomers that form amide linkages at both ends of the repeat unit. Such monomers include lactams, aminocarboxylic acids, dicarboxylic acid and diamines.

In one embodiment desirably at least 50, 65, 75, 76, 80, 90, or 95 mole percent of the amide linkages in the polyamide oligomer or telechelic polyamine are tertiary amide linkages. As earlier explained tertiary amide linkages result from ring opening polymerization of lactams with tertiary amides or reactions of secondary amines with carboxylic acid groups.

The percent of tertiary amide linkages of the total number of amide linkages was calculated with the following equation:

$$\text{Tertiary amide linkage \%} = \frac{\sum_{i=1}^{n}(w_{tertN,i} \times n_i)}{\sum_{i=1}^{n}(w_{totalN,i} \times n_i)} \times 100$$

where: n is the number of monomers; the index i refers to a certain monomer; $w_{tertN}$ is the average number nitrogen atoms in a monomer that form or are part of tertiary amide linkages in the polymerizations, (note: end-group forming amines do not form amide groups during the polymerizations and their amounts are excluded from $w_{tertN}$); $w_{totalN}$ is the average number nitrogen atoms in a monomer that form or are part of tertiary amide linkages in the polymerizations (note: the end-group forming amines do not form amide groups during the polymerizations and their amounts are excluded from $w_{totalN}$); and $n_i$ is the number of moles of the monomer with the index i.

The percent of amide linkages of the total number of all heteroatom containing linkages (connecting hydrocarbon linkages) was calculated by the following equation:

$$\text{Amide linkage \%} = \frac{\sum_{i=1}^{n}(w_{totalN,i} \times n_i)}{\sum_{i=1}^{n}(w_{totalS,i} \times n_i)} \times 100$$

where: $W_{totalS}$ is the sum of the average number of heteroatom containing linkages (connecting hydrocarbon linkages) in a monomer and the number of heteroatom containing linkages (connecting hydrocarbon linkages) forming from that monomer by the reaction with a carboxylic acid bearing monomer during the polyamide polymerizations; and all other variables are as defined above. The term "hydrocarbon linkages" as used herein are just the hydrocarbon portion of each repeat unit formed from continuous carbon to carbon bonds (i.e. without heteroatoms such as nitrogen or oxygen) in a repeat unit. This hydrocarbon portion would be the ethylene or propylene portion of ethylene oxide or propylene oxide; the undecyl group of dodecyllactam, the ethylene group of ethylenediamine, and the $(CH_2)_4$ (or butylene) group of adipic acid.

Preferred amide or tertiary amide forming monomers include dicarboxylic acids, diamines, aminocarboxylic acids and lactams. Preferred dicarboxylic acids are where the alkylene portion of the dicarboxylic acid is a cyclic, linear, or branched (optionally including aromatic groups) alkylene of 2 to 36 carbon atoms, optionally including up to 1 heteroatom per 3 or 10 carbon atoms of the diacid, more preferably from 4 to 36 carbon atoms (the diacid would include 2 more carbon atoms than the alkylene portion). These include dimer fatty acids, hydrogenated dimer acid, sebacic acid, etc. Generally we prefer diacids with larger alkylene groups as this generally provides polyamide repeat units with lower Tg value.

Preferred diamines include those with up to 60 carbon atoms, optionally including one heteroatom (besides the two nitrogen atoms) for each 3 or 10 carbon atoms of the diamine and optionally including a variety of cyclic, aromatic or heterocyclic groups providing that one or both of the amine groups are secondary amines, a preferred formula is:

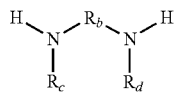

wherein: $R_b$ is a direct bond or a linear or branched (optionally being or including cyclic, heterocyclic, or aromatic portion(s)) alkylene group (optionally containing up to 1 or 3 heteroatoms per 10 carbon atoms of the diamine) of 2 to 36 carbon atoms and more preferably 2 or 4 to 12 carbon atoms; and $R_c$ and $R_d$ are individually a linear or branched alkyl group of 1 to 8 carbon atoms, more preferably 1 or 2 to 4 carbon atoms or $R_c$ and $R_d$ connect together to form a single linear or branched alkylene group of 1 to 8 carbon atoms or optionally with one of $R_c$ and $R_d$ is connected to $R_b$ at a carbon atom, more desirably $R_c$ and $R_d$ being 1 or 2 to 4 carbon atoms.

Such diamines include Ethacure™ 90 from Albermarle (supposedly a N,N'-bis(1,2,2-trimethylpropyl)-1,6-hexanediamine); Clearlink™ 1000 from Dorfketal, or Jefflink™ 754 from Huntsman; N-methylaminoethanol; dihydroxy terminated, hydroxyl and amine terminated or diamine terminated poly(alkyleneoxide) where the alkylene has from 2 to 4 carbon atoms and having molecular weights from about 40 or 100 to 2000; N,N'-diisopropyl-1,6-hexanediamine; N,N'-di(sec-butyl) phenylenediamine; piperazine; homopiperazine; and methyl-piperazine. Jefflink™754 has the structure:

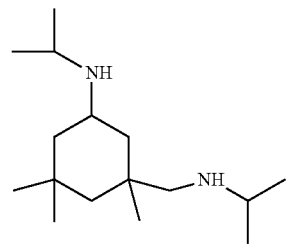 [SMILES: CC(C)NCC1(C)CC(NC(C)C)CC(C)(C)C1]

while Clearlink™ 1000 has the structure:

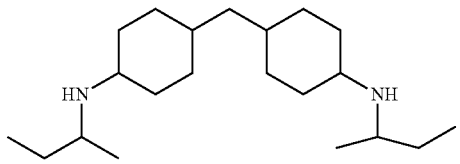 [SMILES: CCC(C)NC1CCC(CC2CCC(NC(C)CC)CC2)CC1]

while another diamine with an aromatic group is: N,N'-di(sec-butyl) phenylenediamine, see structure below:

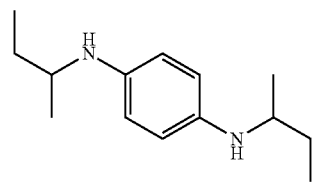 [SMILES: CCC(C)Nc1ccc(NC(C)CC)cc1]

where preferred diamines are diamines wherein both amine groups are secondary amines.

Preferred lactams are lactams include straight chain or branched alkylene segments therein of 4 to 12 carbon atoms such that the ring structure without substituents on the nitrogen of the lactam has 5 to 13 carbon atoms total (when one includes the carbonyl) and the substituent on the nitrogen of the lactam (if the lactam is a tertiary amide) is an alkyl group of from 1 to 8 carbon atoms and more desirably an alkyl group of 1 to 4 carbon atoms. Dodecyl lactam, alkyl substituted dodecyl lactam, caprolactam, alkyl substituted caprolactam, and other lactams with larger alkylene groups are preferred lactams as they provide repeat units with lower Tg values. Aminocarboxylic acids have the same number of carbon atoms as the lactams. Desirably the number of carbon atoms in the linear or branched alkylene group between the amine and carboxylic acid group of the aminocarboxylic acid is from 4 to 12 and the substituent on the nitrogen of the amine group (if it is a secondary amine group) is an alkyl group with from 1 to 8 carbon atoms, more preferably 1 or 2 to 4 carbon atoms. Aminocarboxylic acids with secondary amine groups are preferred.

In one embodiment desirably at least 50 wt. %, more desirably at least 60, 70, 80 or 90 wt. % of said polyamide oligomer or telechelic polyamide comprise repeat units from diacids and diamines of the structure of the repeat unit being:

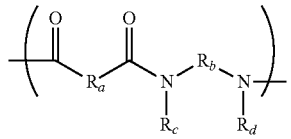

wherein: $R_a$ is the alkylene portion of the dicarboxylic acid and is a cyclic, linear, or branched (optionally including aromatic groups) alkylene of 2 to 36 carbon atoms, optionally including up to 1 heteroatom per 3 or 10 carbon atoms of the diacid, more preferably from 4 to 36 carbon atoms (the diacid would include 2 more carbon atoms than the alkylene portion); and $R_b$ is a direct bond or a linear or branched (optionally being or including cyclic, heterocyclic, or aromatic portion(s)) alkylene group (optionally containing up to 1 or 3 heteroatoms per 10 carbon atoms) of 2 to 36 or 60 carbon atoms and more preferably 2 or 4 to 12 carbon atoms and $R_c$ and $R_d$ are individually a linear or branched alkyl group of 1 to 8 carbon atoms, more preferably 1 or 2 to 4 carbon atoms or $R_c$ and $R_d$ connect together to form a single linear or branched alkylene group of 1 to 8 carbon atoms or optionally with one of $R_c$ and $R_d$ is connected to $R_b$ at a carbon atom, more desirably $R_c$ and $R_d$ being an alkyl group of 1 or 2 to 4 carbon atoms.

In one embodiment desirably at least 50 wt. %, more desirably at least 60, 70, 80 or 90 wt. % of said polyamide oligomer or telechelic polyamide comprise repeat units from lactams or amino carboxylic acids of the structure:

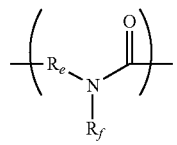

Repeat units can be in a variety of orientations in the oligomer derived from lactams or amino carboxylic acid depending on initiator type, wherein each $R_e$ independently is linear or branched alkylene of 4 to 12 carbon atoms and each $R_f$ independently is a linear or branched alkyl of 1 to 8, more desirably 1 or 2 to 4, carbon atoms.

The above described polyamide oligomers and telechelic polyamide are useful to make polymers by reacting the polyamide oligomer or telechelic polyamide with co-reactants having two or more reactive groups that can form chemical bonds when reacted with the functional groups of the polyamide oligomers or telechelic polyamide (e.g. these functional groups of the polyamide include primary and secondary amine, primary or secondary hydroxyl, or carboxylic acid group). The reactive groups on the co-reactants may be isocyanate, or with particular telechelic polyamides they could be hydroxyl, amine or carboxylic acid groups.

While not wishing to be bound by theory, it is believed the telechelic polyamides described herein are uniquely suited for use in the preparation of polymers, including TPU. This is mainly due to their viscometric properties and their relatively low glass transition temperatures. These properties make the telechelic polyamides described herein much easier to use and handle at conditions generally used for the preparation of polymers like TPU thus overcoming a significant barrier to use polyamide materials that has previously made it difficult to effectively prepare TPU using polyamide materials.

The polymers of the invention may also be blended with one or more conventional polymers. For example, one or more polymers of the invention may be physically blended with a polyester TPU, a polyether TPU, a polycarbonate TPU, or any combination thereof.

The weight average molecular weight (Mw) of the polymers of the invention can range from 80,000 to 600,000 g/mol, or from 100,000 to 300,000, or from 80,000 to about 250,000 g/mol. The Mw of the polymer is measured according to gel permeation chromatography (GPC) against polystyrene standard.

The TPU polymers of the present invention can be mixed with various conventional additives or compounding agents, such as fillers, antioxidants, antiozone agents, antihydrolysis agents, extrusion aids, UV stabilizers, chain terminators, light stabilizers, colorants, extenders, pigments, lubricants, plasticizers, flame retardants, UV absorbers, and the like. Fillers that can be used include talc, silicates, clays, calcium carbonate, and the like. The level of additives will depend on the final properties and cost of the desired end-use application, as is well known to those skilled in the art of compounding TPUs. The additives may be added during the reaction to form the TPU, or in a second compounding step.

Antioxidants typically prevent or terminate oxidation reactions that result in degradation of the polyurethane article over the lifetime of the article. Typical antioxidants include ketones, aldehydes, and aryl amines, as well as phenolic compounds. Specific examples of compounds include ethylenebis(oxyethylene)bis(3-t-butyl-4-hydroxy-5-methylcinnamate and tetrakis [methylene(3,5-di-t-butyl-4-hydroxyhydrocinnamate)]methane. Examples of suitable commercial antioxidants include Irganox 1010, Irganox 1098, Irganox 565, and Irganox 1035 (Ciba-Geigy Corp., Ardsley, N.Y.).

Antiozone agents prevent or reduce damage caused by ozone and antihydrolysis agents prevent or reduce damage by water and other hydrolyzing compounds. Examples of suitable antiozonants include p-phenylenediamine derivatives. Antihydrolysis agents include, for example, Stabaxol P and Stabaxol P-200 (Rhein Chemie, Trenton, N.J.).

Extrusion aids facilitate movement of the polyurethane through the extruder. Waxes, such as Wax E (Hoechst-Celanese Corp., Chatham, N.J.), Acrawax (Lonza Inc., Fair Lawn, N.J.) and oxidized polyethylene 629A (Allied-Signal Inc., Morristown, N.J.), are suitable extrusion aids. These extrusion aids can also act as mold-release agents or additional mold release agents can be added to the composition.

Chain terminators are used to control molecular weight. Examples of chain terminators include monoalcohol compounds having 8 or more carbon atoms.

Light stabilizers prevent or reduce degradation of a polymer product due to visible or ultraviolet light. Examples of suitable light stabilizers include benzotriazole, such as Tinuvin P, and hindered amine light stabilizers, such as Tinuvin 770.

Generally speaking, the compositions of the invention are focused thermoplastic polyurethanes. In some embodiments, the compositions of the invention are essentially free of and even free of thermoset polyurethanes, that is materials that cannot be re-melted or re-worked, for example due to significant crosslinking or similar reaction that is a feature of thermoset materials.

The polymers of the invention are useful in a wide variety of applications, and especially in applications where conventional polymers, and more specifically conventional TPU, do not have the necessary level of solvent resistance, hydrolytic stability, oxidative stability, thermal stability, and/or adhesion to polar materials.

The polymers of the invention may be used in the construction of side curtain air bags, as layer to be used with Nylon 6,6, a materials commonly used in side curtain air bags but which has poor adhesion to conventional TPU, preventing the more widespread use if conventional TPU in this application. The polymers of the invention may be used in coating blanket applications, in combination with Mylar™ and/or PET fabric. The polymers of the invention may be used in fuel bag applications and/or high heat cable applications where improved chemical, thermal, and/or hydrolytic stability is required. The polymers of the invention may be drawn into fibers. The polymers of the invention may be used in combination with Nylon fabric and/or Nylon fiber where improved adhesion between the materials is required.

While certain representative embodiments and details have been shown for the purpose of illustrating the subject invention, it will be apparent to those skilled in this art that various changes and modifications can be made therein without departing from the scope of the subject invention.

EXAMPLES

The invention will be further illustrated by the following examples, which set forth particularly advantageous embodiments. While the examples are provided to illustrate the invention, they are not intended to limit it.

Example 1

A telechelic polyamide is prepared by the following procedure: 246.6 grams of sebacic acid, 240.6 grams of dodecanedioic acid, 92.0 grams of piperazine, 300 grams of water are charged to a reactor under $N_2$ atmosphere. The reactor is heated to 100° C. and the water is evaporated. Heating is continued to 180° C. and this temperature is maintained for 3 hours. The resulting product is a white paste at room temperature with carboxylic acid end groups and a number average molecular weight of about 450, with 100% tertiary amide linkages and 100% amide linkages.

Example 2

A telechelic polyamide is prepared by the following procedure: the telechelic polyamide of Example 1 is combined with 503.7 grams of a 270 number average molecular weight polytetramethylene ether gycol into a reactor. The reactor is heated to 180° C. and the mixture is reacted for 3 hours at atmospheric pressure. 0.15 grams of dibutyltin dilaurate catalyst is added and the pressure of the reactor is decreased to 1-30 mbar. The reaction is continued for an additional 4 hours at 180° C. and then for 4 hours at 200° C. The resulting product is a white paste at room temperature with primary alcohol end groups and a number average molecular weight of about 1500, with 100% tertiary amide linkages and 23% amide linkages.

Example 3

A polymer is prepared by a conventional high temperature melt polymerization procedure used for TPU synthesis. The Example 2 material (189.0 grams) is melted in a reaction vessel at 120° C. and mixed with 1,4-butanediol (10.51 grams) for 20 minutes. Then this mixture is reacted with molten 4,4'-methylenebis-(phenyl isocyanate) (70.30 grams) at temperature for 2 minutes. The final TPU is cured in a conventional oven at 105° C. for 2 hours.

The resulting polymer has the expected useful properties of a polyether and/or polyester TPU but also provides improved hydrolytic, oxidative and/or thermal stability along with improved adhesion to polar materials such as polyamides or polyesters, for example Nylon-6,6.

Each of the documents referred to above is incorporated herein by reference. Except in the Examples, or where otherwise indicated, all numerical quantities in this description specifying amounts, reaction conditions, molecular weights, number of carbon atoms, etc., are to be understood as modified by the word "about." Unless otherwise indicated, all percent and formulation values are on a molar basis. Unless otherwise indicated, all molecular weights are number average molecular weights. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration. All of the embodiments of the invention described herein are contemplated from and may be read from both an open-ended and inclusive view (i.e. using "comprising of" language) and a closed and exclusive view (i.e. using "consisting of" language). As used herein parentheses are used designate 1) that the something is optionally present such that monomer(s) means monomer or monomers or (meth) acrylate means methacrylate or acrylate, 2) to qualify or further define a previously mentioned term, or 3) to list narrower embodiments.

What is claimed is:
1. A thermoplastic polyurethane composition comprising the reaction product of: (i) a polyol component containing a telechelic polyamide; and (ii) a polyisocyanate component; and optionally (iii) a chain extender component;
   wherein the telechelic polyamide:
   (a) has repeat units connected by linkages, wherein the linkages comprise heteroatom containing linkages, and has functional end groups selected from carboxyl or primary or secondary amine, wherein at least 70 mole percent of the telechelic polyamide has exactly two functional end groups of the same functional type selected from the group consisting of amine or carboxyl functional end groups;
   (b) has a polyamide segment comprising at least two amide linkages derived from reacting an amine with a carboxyl group, wherein said polyamide segment comprises repeat units derived from two or more monomers selected from lactams, aminocarboxylic acids, dicarboxylic acids, and diamines;
   (c) wherein at least 10 percent of the total number of the heteroatom containing linkages are amide linkages; and

(d) wherein at least 50 percent of the amide linkages are tertiary amide linkages.

2. The thermoplastic polyurethane composition of claim 1 wherein said polyamide segment of feature (b) has at least one of the following conditions:
   (i) where said amide linkages are derived from polymerizing amide forming monomers and at least 90 mole percent of said monomers are selected from the group consisting of lactams and aminocarboxylic acid monomers such that said polyamide is a copolymer of at least two different monomers; or
   (ii) where said amide linkages are derived from polymerizing amide forming monomers and at least 90 mole percent of said monomers are combined amounts of dicarboxylic acid and diamine monomers such that said polyamide is a copolymer of at least three different monomers; or
   (iii) where said amide linkages are derived from polymerizing a combination of dicarboxylic acid, diamine and either lactam and/or aminocarboxylic acid monomers such that the total dicarboxylic acid monomer(s) and the diamine monomer(s) are present at 10 mole percent or more and the total lactam and/or aminocarboxylic acid monomers are present in the monomer blend at 10 mole percent or more.

3. The thermoplastic polyurethane composition of claim 1 wherein at least 50 weight percent of said telechelic polyamide is made up of repeating units derived from monomers selected from the group of lactam monomers, aminocarboxylic acid monomers, dicarboxylic acid monomers, and diamine monomers.

4. The thermoplastic polyurethane composition of claim 1 wherein at least 10 weight percent of said telechelic polyamide is made up of repeating units derived from monomers selected from the group of lactam monomers, aminocarboxylic acid monomers, dicarboxylic acid monomers, and diamine monomers.

5. The thermoplastic polyurethane composition of claim 1 wherein at least 50 weight percent of said polyamide segment comprises repeat units of the structure:

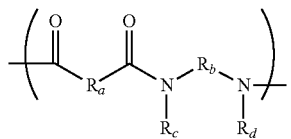

wherein $R_a$ is the alkylene portion of the dicarboxylic acid and is a cyclic, linear, or branched alkylene of 2 to 36 carbon atoms, optionally including up to 1 heteroatom per 3 or 10 carbon atoms of the diacid; and
wherein $R_b$ is a direct bond or a linear or branched alkylene group of 2 to 60 carbon atoms and $R_c$ and $R_d$ are individually a linear or branched alkyl group of 1 to 8 carbon atoms, or $R_c$ and $R_d$ connect together to form a single linear or branched alkylene group of 1 to 8 carbon atoms.

6. The thermoplastic polyurethane composition of claim 5 wherein said unit:

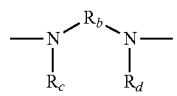

within the repeat unit structure of said polyamide segment is derived from polymerizing diamine monomers including piperazine.

7. The thermoplastic polyurethane composition of claim 1 wherein at least 50 weight percent of said polyamide segment comprises repeat units of the structure:

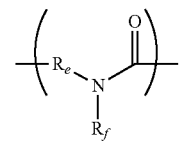

wherein said repeat units are derived from monomers selected from the group consisting of lactams monomers and amino carboxylic acid monomers; wherein each $R_e$ is independently a linear or branched alkyl containing 5 to 12 carbon atoms, and each $R_f$ is independently a linear or branched alkyl containing 1 to 8 carbon atoms.

8. The thermoplastic polyurethane composition of claim 1 wherein at least 80 percent of the functional end groups of the telechelic polyamide of component (i) are secondary amine groups.

9. The thermoplastic polyurethane composition of claim 1 wherein at least 80 percent of the functional end groups of the telechelic polyamide of component (i) are terminal primary or secondary carboxyl end groups.

10. The thermoplastic polyurethane composition of claim 1 wherein the telechelic polyamide has a weight average molecular weight from about 200 to 10,000 g/mole; and
   wherein said telechelic polyamide, free of any solvents, has a viscosity of less than 100,000 cps at 70° C. as measured by a Brookfield circular disc viscometer with the circular disc spinning at 5 rpm.

11. The thermoplastic polyurethane composition of claim 1 wherein said telechelic polyamide further comprises at least one oligomer segment selected from the group consisting of a polyester segment, a polyether segment, a polycarbonate segment, or a combination thereof.

12. The thermoplastic polyurethane composition of claim 1 wherein component (ii), the polyisocyanate component, comprises an aromatic diisocyanate, an aliphatic diisocyanate, or a mixture thereof.

13. The thermoplastic polyurethane composition of claim 1 wherein component (ii), the polyisocyanate component, comprises diphenyl methane-4, 4'-diisocyanate (MDI), $H_{12}$ MDI, m-xylylene diisocyanate (XDI), m-tetramethyl xylylene diisocyanate (TMXDI), phenylene-1, 4-diisocyanate (PPDI), 1,5-naphthalene diisocyanate (NDI), diphenylmethane-3, 3'-dimethoxy-4, 4'-diisocyanate (TODI), isophorone diisocyanate (IPDI), 1,4-cyclohexyl diisocyanate (CHDI), hexamethylene diisocyanate (HDI), 1,6-diisocyanato-2,2,4,4-tetramethyl hexane (TMDI), 1,10-decane diisocyanate, trans-dicyclohexylmethane diisocyanate (HMDI), or any combination thereof.

14. The thermoplastic polyurethane composition of claim 1 wherein component (iii), the chain extender component, comprises one or more short chain glycols having from about 2 to about 10 carbon atoms.

15. The thermoplastic polyurethane composition of claim 1 wherein component (iii), the chain extender component, comprises ethylene glycol, diethylene glycol, propylene glycol, dipropylene glycol, tripropylene glycol, triethylene glycol, cis-trans-isomers of cyclohexyl dimethylol, neopentyl glycol, 1,4-butanediol, 1,6-hexandiol, 1,3-butanediol, and 1,5-pentanediol, benzene glycol (HQEE), xylylene glycols, resorcinol, bis(beta-hydroxyethyl) ether, catechol, or any combinations thereof.

16. The thermoplastic polyurethane composition of claim 1, wherein at least 75 percent of the amide linkages are tertiary amide linkages.

17. The thermoplastic polyurethane composition of claim 1, wherein at least 85 percent of the amide linkages are tertiary amide linkages.

* * * * *